United States Patent
Lindner

(10) Patent No.: US 11,046,813 B2
(45) Date of Patent: Jun. 29, 2021

(54) ALKOXYLATED POLYSORBATE ESTER ADJUVANTS

(71) Applicant: CRODA, INC., Edison, NJ (US)

(72) Inventor: Gregory James Lindner, Wilmington, DE (US)

(73) Assignee: Croda, Inc., Plainsboro, NJ (US)

( * ) Notice: Subject to any disclaimer, the term of this patent is extended or adjusted under 35 U.S.C. 154(b) by 24 days.

(21) Appl. No.: 15/024,567

(22) PCT Filed: Oct. 8, 2014

(86) PCT No.: PCT/US2014/059612
§ 371 (c)(1),
(2) Date: Mar. 24, 2016

(87) PCT Pub. No.: WO2015/057439
PCT Pub. Date: Apr. 23, 2015

(65) Prior Publication Data
US 2016/0244562 A1 Aug. 25, 2016

Related U.S. Application Data

(60) Provisional application No. 61/892,740, filed on Oct. 18, 2013.

(51) Int. Cl.
*C08G 65/08* (2006.01)
*A01N 25/30* (2006.01)
*C08G 65/26* (2006.01)

(52) U.S. Cl.
CPC ............. *C08G 65/08* (2013.01); *A01N 25/30* (2013.01); *C08G 65/2615* (2013.01); *C08G 2650/26* (2013.01); *C08G 2650/58* (2013.01)

(58) Field of Classification Search
CPC ............ C08G 65/2615; C08G 2650/26; C08G 2650/58
See application file for complete search history.

(56) References Cited

U.S. PATENT DOCUMENTS

| 4,459,185 A | 7/1984 | Obata |
| 4,851,421 A | 7/1989 | Iwasaki |
| 8,501,667 B2 | 8/2013 | Ishihara et al. |
| 2010/0160165 A1 | 6/2010 | Bratz et al. |
| 2011/0086760 A1 | 4/2011 | Giner |
| 2013/0244877 A1 | 9/2013 | Lindner |
| 2014/0213668 A1 | 7/2014 | Meyer |

FOREIGN PATENT DOCUMENTS

| JP | 57003847 | 1/1982 | |
| JP | 59164661 A | 9/1984 | |
| JP | 3797710 | 7/2006 | |
| RU | 2404584 C2 | 11/2010 | |
| WO | 199400508 | 1/1994 | |
| WO | 199616930 | 6/1996 | |
| WO | WO 2012024276 A1 * | 2/2012 | ............. A01N 25/30 |

OTHER PUBLICATIONS

J. F. Kenney, "Properties of Block Versus Random Copolymers," Polymer Engineering and Science, Jul. 1968, vol. 8, No. 3, 216-226.*
International Search Report and Written Opinion of the International Searching Authority for International Application No. PCT/US2014/059612, dated Mar. 12, 2015.
Russian Office Action and Search Report for Russian Application No. 2016118924/13, dated May 10, 2018, with translation, 9 pages.

* cited by examiner

*Primary Examiner* — Monica A Shin
(74) *Attorney, Agent, or Firm* — RatnerPrestia

(57) ABSTRACT

An agrochemical formulation comprising an agricultural active and an adjuvant is disclosed. The adjuvant comprises a residue of sorbitan or sorbitan derivative having at least one active hydrogen atom replaced to form an ethyloxylated or propoxylated ester. The adjuvant and methods of treating crops with an agrochemical formulation comprising the adjuvant are also disclosed.

13 Claims, No Drawings

ALKOXYLATED POLYSORBATE ESTER ADJUVANTS

CROSS REFERENCE TO RELATED APPLICATIONS

This application is the National Stage filing of International Appln. No. PCT/US2014/059612, filed 8 Oct. 2014, which itself claims priority of U.S. Provisional Patent Application No. 61/892,740, filed 18 Oct. 2013, the entirety of which applications is incorporated herein by reference for all purposes.

The present invention relates to adjuvants for agrochemical active formulations, and a method of providing adjuvancy in agrochemical formulations comprising said adjuvant compounds with one or more agrochemical actives. The present invention also includes methods of treating crops with such formulations.

An adjuvant is generally defined as a chemical or a mixture of chemicals (commonly surfactants) capable of improving the biological activity or effectiveness of an agrochemical active. Adjuvants do not themselves control or kill pests. Instead, these additives modify some property (e.g., spreading, retention, penetration, droplet size, etc.) of the agrochemical formulation which improves the ability of the active to penetrate, target, or protect the target organism. The typical types of compounds used as adjuvants may include surfactants, emulsifiers, oils, and salts. Adjuvants do not significantly inhibit translocation of the active in the treated plant. In addition, the adjuvant should not produce unwanted phytotoxic effects on the plant.

One particular problem with agrochemical formulations is that typical adjuvants such as known polysorbates may be limited in their applicability. In particular, the quantity of adjuvant added to the agrochemical formulation may be limited as above certain amounts the formulation may become undesirably thickened or destabilised. In particular, the inclusion rate of known adjuvants in aqueous and/or solvent based formulations may be problematic. It may be possible to overcome such limitations through formulation techniques. However, that approach may use up already limited formulation space and reduce the space available for more desirable components such as active ingredients.

The present invention seeks to provide compounds suitable for use as adjuvants in agrochemical formulations, where said adjuvants may be able to overcome the above described problems. Additionally, the present invention seeks to provide adjuvants which may have desired properties such as surfactancy, viscosity at reduced temperatures, and dilution performance in cold water. The present invention provides for the use of the adjuvant compounds in agrochemical compositions in combination with an agrochemical active, where the compounds may provide desired adjuvancy. The present invention also seeks to provide the use of agrochemical concentrates and dilute formulations comprising said adjuvants.

According to a first aspect of the present invention there is provided an agrochemical formulation comprising;
i) an adjuvant; and
ii) at least one agrochemical active;
wherein said adjuvant has general structure (I):

$$\text{Sorb.}(AO_1H)_{n1}(AO_2H)_{n2}(AO_3H)_{n3}(AO_4R^1)_{n4} \quad \text{(I)}$$

wherein;
Sorb represents a residue of a sorbitan or sorbitan derivative;
$AO_1$, $AO_2$, $AO_3$, and $AO_4$ each independently represents an oxyalkylene chain formed from oxyethylene units, oxypropylene units, or a mixture thereof, wherein at least one of $AO_1$,
$AO_2$, $AO_3$, and $AO_4$ comprises a mixture of oxyethylene and oxypropylene units;
the total sum of oxyethylene units and oxypropylene units is in the range from 5 to 38;
n1, n2, and n3 each independently represent an integer having a value of 0 or 1;
n4 represents a value of 1; and
$R^1$ represents an alkanoyl group —C(O)$R^2$ wherein $R^2$ represents a $C_4$ to $C_{28}$ hydrocarbyl.

According to a second aspect of the present invention there is provided a concentrate formulation suitable for making an agrochemical formulation of the first aspect, said concentrate comprising;
i) an adjuvant, wherein said adjuvant wherein said adjuvant has general structure (I):

$$\text{Sorb.}(AO_1H)_{n1}(AO_2H)_{n2}(AO_3H)_{n3}(AO_4R^1)_{n4} \quad \text{(I)}$$

wherein;
Sorb represents a residue of a sorbitan or sorbitan derivative;
$AO_1$, $AO_2$, $AO_3$, and $AO_4$ each independently represents an oxyalkylene chain formed from oxyethylene units, oxypropylene units, or a mixture thereof, wherein at least one of $AO_1$,
$AO_2$, $AO_3$, and $AO_4$ comprises a mixture of oxyethylene and oxypropylene units;
the total sum of oxyethylene units and oxypropylene units is in the range from 5 to 38;
n1, n2, and n3 each independently represent an integer having a value of 0 or 1;
n4 represents a value of 1;
$R^1$ represents an alkanoyl group —C(O)$R^2$ wherein $R^2$ represents a $C_4$ to $C_{28}$ hydrocarbyl; and
ii) optionally, at least one agrochemical active.

According to a third aspect of the present invention there is provided the use of compound having general structure (I):

$$\text{Sorb.}(AO_1H)_{n1}(AO_2H)_{n2}(AO_3H)_{n3}(AO_4R^1)_{n4} \quad \text{(I)}$$

wherein;
Sorb represents a residue of a sorbitan or sorbitan derivative;
$AO_1$, $AO_2$, $AO_3$, and $AO_4$ each independently represents an oxyalkylene chain formed from oxyethylene units, oxypropylene units, or a mixture thereof, wherein at least one of $AO_1$, $AO_2$, $AO_3$, and $AO_4$ comprises a mixture of oxyethylene and oxypropylene units;
the total sum of oxyethylene units and oxypropylene units is in the range from 5 to 38;
n1, n2, and n3 each independently represent an integer having a value of 0 or 1;
n4 represents a value of 1; and
$R^1$ represents an alkanoyl group —C(O)$R^2$ wherein $R^2$ represents a $C_4$ to $C_{28}$ hydrocarbyl;
as an adjuvant in an agrochemical formulation comprising at least one agrochemical active.

According to a fourth aspect of the present invention there is provided a method of treating vegetation to control pests, the method comprising applying a formulation of the first aspect, and/or a diluted concentrate formulation of the second aspect, either to said vegetation or to the immediate environment of said vegetation.

According to a fifth aspect of the present invention, there is provided a compound having general structure (I):

$$\text{Sorb.}(AO_1H)_{n1}(AO_2H)_{n2}(AO_3H)_{n3}(AO_4R^1)_{n4} \quad (I)$$

wherein;
Sorb represents a residue of a sorbitan or sorbitan derivative;
$AO_1$, $AO_2$, $AO_3$, and $AO_4$ each independently represents an oxyalkylene chain formed from oxyethylene units, oxypropylene units, or a mixture thereof, wherein at least one of $AO_1$, $AO_2$, $AO_3$, and $AO_4$ comprises a mixture of oxyethylene and oxypropylene units;
the total sum of oxyethylene units and oxypropylene units is in the range from 5 to 38;
n1, n2, and n3 each independently represent an integer having a value of 0 or 1;
n4 represents a value of 1; and
$R^1$ represents an alkanoyl group —C(O)$R^2$ wherein $R^2$ represents a $C_4$ to $C_{28}$ hydrocarbyl; suitable for use as an adjuvant in an agrochemical formulation.

It has been found that fatty acid sorbitans mono esters which are ethoxylated and propoxylated provide for desired adjuvancy properties when used in an agrochemical formulation having at least one agrochemical active.

As used herein, the terms 'for example,' 'for instance,' 'such as,' or 'including' are meant to introduce examples that further clarify more general subject matter. Unless otherwise specified, these examples are provided only as an aid for understanding the applications illustrated in the present disclosure, and are not meant to be limiting in any fashion.

It will be understood that, when describing the number of carbon atoms in a substituent group (e.g., '$C_1$ to $C_6$ alkyl'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

The adjuvant of the present invention has general structure (I):

$$\text{Sorb.}(AO_1H)_{n1}(AO_2H)_{n2}(AO_3H)_{n3}(AO_4R^1)_{n4} \quad (I)$$

wherein;
Sorb represents a residue of a sorbitan or sorbitan derivative;
$AO_1$, $AO_2$, $AO_3$, and $AO_4$ each independently represents an oxyalkylene chain formed from oxyethylene units, oxypropylene units, or a mixture thereof, wherein at least one of $AO_1$, $AO_2$, $AO_3$, and $AO_4$ comprises a mixture of oxyethylene and oxypropylene units;
the total sum of oxyethylene units and oxypropylene units is in the range from 5 to 38;
n1, n2, and n3 each independently represent an integer having a value of 0 or 1;
n4 represents a value of 1; and
$R^1$ represents an alkanoyl group —C(O)$R^2$ wherein $R^2$ represents a $C_4$ to $C_{28}$ hydrocarbyl.

The adjuvant of the present invention is, at least notionally, built up from the group Sorb that can be considered as the 'core group' of the compound. This core group represents the residue (i.e., after removal of at least one active hydrogen atom) of a sorbitan or sorbitan derivative containing at least one active hydrogen atom, and is referred to herein as a sorbitan or sorbitan derivative residue.

The term 'sorbitan or sorbitan derivative residue' as used herein, unless otherwise defined, therefore refers to an organic radical derived from sorbitan or sorbitan derivative by removal of at least one active hydrogen atom, the hydrogen atom being from one of the hydroxyl groups present. The term 'active hydrogen' refers to the hydrogen atoms present as part of the hydroxyl groups of the sorbitan or sorbitan derivative.

In the compounds of the invention, the sorbitan residue at the core of the molecule, corresponding to the residue 'Sorb' in formula (I) may be selected from residues of any suitable sorbitan or sorbitan derivative. In particular, it may be selected from 1,4-anhydrosorbitol, 1,5-anhydrosorbitol, and 3,6-anhydrosorbitol. Particularly preferred are 1,4-anhydrosorbitol and 3,6-anhydrosorbitol.

The reactions to form the ethoxylated/propoxylated ester will replace at least one of the active hydrogen atoms of the sorbitan or sorbitan derivative, thereby giving a mono-ester of the ethoxylated/propoxylated sorbitan. It will be envisaged that the any of the active hydrogen atoms of the sorbitan or sorbitan derivative may be suitably substituted, although particular sites may be restricted or prevented by steric hindrance.

The sorbitan or sorbitan derivative residue may be homogeneous in that it comprises only one specific sorbitan or sorbitan derivative residue and is formed from one specific sorbitan or sorbitan derivative. In an alternative embodiment, the sorbitan or sorbitan derivative residue starting material may be heterogeneous in that it comprises a mixture of a number of different sorbitan or sorbitan derivatives selected from those listed herein, and therefore the sorbitan or sorbitan derivative residues formed therefrom may be heterogeneous. Preferably, the sorbitan or sorbitan derivative residue is homogeneous.

In one particular embodiment, sorbitan or sorbitan derivatives obtainable from natural saccharide processing will be preferred.

$R^1$ represents an alkanoyl group represented by —C(O)$R^2$ wherein $R^2$ represents a $C_4$ to $C_{28}$ hydrocarbyl. It will be understood that one $R^1$ group is present per sorbitan or sorbitan derivative molecule, and therefore the adjuvant of the present invention is a mono-ester.

The $C_4$ to $C_{28}$ hydrocarbyl is preferably selected from a $C_4$ to $C_{28}$ alkyl or $C_4$ to $C_{28}$ alkenyl.

The term 'alkyl' as used herein, unless otherwise defined, refers to saturated hydrocarbon radicals being straight chain, branched, or combinations thereof, containing from 4 to 28 carbon atoms. Preferably, the alkyls each contain from 6 to 24 carbon atoms. More preferably, 8 to 22 carbon atoms. Further preferably, 10 to 20 carbon atoms. Most preferably, 12 to 18 carbon atoms.

Examples of alkyl radicals may be independently selected from butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, or branched variants thereof.

The alkyl radicals may preferably be selected from octyl, nonyl, decyl, undecyl, dodecyl, tridecyl, tetradecyl, pentadecyl, hexadecyl, heptadecyl, octadecyl, nonadecyl, or eicosyl. More preferably, decyl, undecyl, dodecyl, tridecyl, tetradecyl, pentadecyl, hexadecyl, heptadecyl, octadecyl, nonadecyl, or eicosyl. Most preferably, dodecyl or octadecyl.

The term 'alkenyl' as used herein, unless otherwise defined, refers to hydrocarbon radicals having at least one or a plurality, preferably no more than four, double bonds. The alkenyl radicals may be straight chain, or branched moieties, or combinations thereof, containing from 4 to 28 carbon atoms. Preferably, the alkenyls each contain from 8 to 26 carbon atoms. More preferably, 10 to 24 carbon atoms. Further preferably, 14 to 22 carbon atoms. Moste preferably, 16 to 20 carbon atoms.

Examples of alkenyl radicals may be independently selected from butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenenyl henicosenyl, docosenyl, tricosenyl, tetracosenyl, pentacosenyl, hexacosenyl, heptacosenyl, octacosenyl, or branched variants thereof.

The alkenyl radicals may preferably be selected from dodecenyl, tridecenyl, tetradecenyl, pentadecenyl, hexadecenyl, heptadecenyl, octadecenyl, nonadecenyl, eicosenyl, or branched variants thereof. More preferably, tetradecenyl, pentadecenyl, hexadecenyl, heptadecenyl, octadecenyl, nonadecenyl, or eicosenyl. Most preferably, octadecenyl.

Said alkanoyl group may preferably be a residue of a fatty acid. The term 'residue of a fatty acid' as used herein refers to the moiety that is the resulting product of the fatty acid in a particular reaction scheme or subsequent formulation or chemical product, regardless of whether the moiety is actually obtained from the specified chemical species. A 'fatty acid residue' thereby refers to the moiety which results when a fatty acid participates in a particular reaction (i.e., the residue is a fatty alkanoyl group $R^2C(O)$—). The fatty acid residue is therefore 'derived' from the respective fatty acid. It is understood that this moiety can be obtained by a reaction with a species other than the specified fatty acid per se, for example, by a reaction with an unsaturated fatty acid chloride, ester, or anhydride.

The fatty acids used in the first adjuvant of the present invention are preferably selected from $C_8$ to $C_{28}$ fatty acids, more preferably $C_{10}$ to $C_{24}$ fatty acids, particularly $C_{12}$ to $C_{20}$ fatty acids. Especially $C_{12}$ and $C_{18}$ fatty acids may be preferred.

The fatty acids may be selected from linear or branched fatty acids. The fatty acids may be selected from saturated or unsaturated fatty acids.

Suitable saturated fatty acids may be selected from caprylic acid, capric acid, lauric acid, myristic acid, palmitic acid, stearic acid, isostearic acid, arachidic acid, behenic acid, or lignoceric acid. Preferred saturated fatty acids may be selected from lauric acid, myristic acid, palmitic acid, isostearic acid, or stearic acid. Most preferably, lauric acid, isostearic acid, or stearic acid.

Where unsaturated fatty acids are present, these may be selected from unsaturated fatty acids comprising at least one unsaturated carbon-carbon double bond. Particularly preferred are unsaturated fatty acids having in the range from 1 to 3 carbon-carbon double bonds. Most preferred are mono-unsaturated or di-unsaturated fatty acids residues. The carbon-carbon double bond(s) of the fatty chain may be present either in a cis or a trans configuration.

Preferably, where the alkanoyl group is derived from an unsaturated fatty acid, said unsaturated fatty acid is linear and mono-unsaturated.

Iodine values are understood to represent the average amount of unsaturation of fats or oils, and is expressed in terms of the number of centigrams of iodine absorbed per gram of sample (% iodine absorbed). Where unsaturated fatty acids are present, said fatty acids may be selected such that the iodine value is greater than 70. Preferably, said iodine value is greater than 75. More preferably, said iodine value is greater than 80. Most preferably said iodine value is greater than 85.

Suitable unsaturated fatty acids may be selected from myristoleic acid, palmitoleic acid, sapienic acid, oleic acid, elaidic acid, vaccenic acid, linoleic acid, linoelaidic acid, arachidonic acid, eicosapentaenoic acid, erucic acid, or docosahexaenoic acid. Preferred unsaturated fatty acids may be selected from oleic acid, linoleic acid, linolenic acid, palmitoleic acid, or elaidic acid. Particularly preferred unsaturated fatty acids may be oleic acid or linoleic acid.

The fatty acid residue may most preferably be selected from oleic acid, stearic acid, or lauric acid.

The fatty acids may be obtained from natural fats and oils, e.g., canola oil, sunflower oil, soybean oil, olive oil, cotton seed oil, grape seed oil, peanut oil, rapeseed oil, safflower oil, cottonseed oil, or tall oil. Preferably canola oil, safflower oil, soybean oil, or tall oil.

In an alternative embodiment, the fatty acid used may be purified prior to use in the present invention. Purification may be undertaken to raise the levels of desired fatty acid chains and reduce the level of undesired fatty acid chains in order to modify the iodine values, titre values, or pour points.

At least one of the active hydrogen atoms present in the sorbitan or sorbitan derivative residue is alkoxylated. Where only one active hydrogen site is alkoxylated it will be seen that the values of n1, n2, and n3 of formula (I) would be 0, whilst n4 would have a value of 1.

Preferably, more than one of the active hydrogen atoms present in the sorbitan or sorbitan derivative residue are alkoxylated. The values of n1, n2, and n3 of formula (I) would therefore be 0 or 1, whilst n4 would have a value of 1.

Where all active hydrogen atoms present in the sorbitan or sorbitan derivative are alkoxylated, the values of n1, n2, n3, and n4 of formula (I) would all be 1.

Alkoxylation of the adjuvant of the present invention comprises use of oxyalkylene groups which are oxyethylene units (—$CH_2CH_2$—O—) and/or oxypropylene units (—$CH_2(CH_3)CH_2$—O—).

Each oxyalkyene group or chain present ($AO_1$, $AO_2$, $AO_3$, and $AO_4$) in the adjuvant may independently comprise oxyethylene, oxypropylene, or a mixture of oxyethylene, oxypropylene units. At least one of the oxyalkyene chains present comprises a mixture of oxyethylene and oxypropylene units.

Each oxyalkylene unit may independently be the same or may be different along said oxyalkylene chain. Therefore, each oxyalkylene chain may be homopolymeric, or may be copolymeric. Preferably, each oxyalkylene chain is copolymeric.

Where the oxyalkylene chain is copolymeric, the oxyalkylene chain may be a block or random copolymer (either normal or reverse) of oxyethylene and oxypropylene units.

Where said copolymer is a block copolymer, this may be in the form of a reverse block copolymer (where the oxyethylene portion is bonded closest to the sorbitan and the oxypropylene portion is bonded furthest from the sorbitan), or a normal block copolymer (where the oxypropylene portion is bonded closest to the sorbitan and the oxyethylene portion is bonded furthest from the sorbitan).

Random copolymers will therefore be understood to refer to oxyalkylene chains where there is a mixture of oxyethylene and oxypropylene units randomly distributed along the chain length.

Where the oxyalkylene chain is a copolymer, it is preferably a reverse or random copolymer. More preferably, a reverse copolymer.

Where co-polymeric chains are used these are copolymers of oxyethylene and oxypropylene units. More preferably, where co-polymeric chains of oxyethylene and oxypropylene are used, the molar proportion of oxyethylene units comprised in the oxyalkylene chain may be in the range of between 20% and 90%. More preferably, in the range of between 30% and 80%. Further preferably, in the range of between 40% and 80%. Most preferably, in the range of between 50% and 75%.

The oxyethylene and oxypropylene units may be evenly distributed over the available active hydrogens sites of the sorbitan residue, with said distribution being close to an expected random distribution.

However, in an alternative embodiment, where the active hydrogen atoms are not equivalent, alkoxylation may result in unequal oxyalkylene chain lengths at each of the active hydrogen sites of the sorbitan.

The number of moles of oxyethylene present in each of the four oxyalkylene chains at each of the active hydrogen sites of the sorbitan or sorbitan derivative may vary. The number of moles of oxyethylene present in each oxyalkylene group may independently be an integer in the range from 0 to 10. It will be understood where the value of is 0 no oxythylene is present in that specific oxyalkylene chain.

Preferably, the number of moles of oxyethylene present in each oxyalkylene group is independently an integer in the range from 1 to 8. More preferably, in the range from 2 to 7. Further preferably, in the range from 2 to 6. Most preferably, in the range from 2 to 5.

The number of moles of oxypropylene present in each of the four oxyalkylene chains at each of the active hydrogen sites of the sorbitan or sorbitan derivative may vary. The number of moles of oxypropylene present in each oxyalkylene group may independently be an integer in the range from 0 to 10. It will be understood where the value of is 0 no oxypropylene is present in that specific oxyalkylene chain.

Preferably, the number of moles of oxypropylene present in each oxyalkylene group is independently an integer in the range from 1 to 8. More preferably, in the range from 1 to 6. Further preferably, in the range from 2 to 5. Most preferably, in the range from 2 to 4.

The total number of moles of oxyethylene units present in each adjuvant molecule may be an integer value in the range of from 1 to 19. Preferably, in the range from 4 to 18. More preferably, in the range from 6 to 17. Further preferably, in the range from 8 to 16. Most preferably, in the range from 10 to 15.

The total number of moles of oxypropylene units in each adjuvant molecule, and said sum has an integer value in the range of from 1 to 19. Preferably, in the range from 2 to 17. More preferably, in the range from 3 to 14. Further preferably, in the range from 4 to 12. Most preferably, in the range from 5 to 10.

The total number of moles of both oxyethylene and oxypropylene units present in each adjuvant molecule has an integer value in the range of from 5 to 38. Preferably, in the range from 8 to 32. More preferably, in the range from 12 to 28. Further preferably, in the range from 15 to 25. More further preferably, in the range from 18 to 22. Most preferably, total number of moles of both oxyethylene and oxypropylene units present in each adjuvant molecule is 20.

The molecular weight (weight average) of the adjuvant is preferably in the range from 450 to 2,700, more preferably 590 to 1,500, particularly 800 to 2,200, further preferably, 1,000 to 1,900, more further preferably 1,100 to 1,800, and especially 1,200 to 1,600.

Specific preferred examples of adjuvants of the present invention may be selected from the group comprising polyoxyethylene (15) polyoxypropylene (5) (normal copolymer) sorbitan mono-laurate, polyoxyethylene (10) polyoxypropylene (10) (normal copolymer) sorbitan mono-laurate, polyoxyethylene (5) polyoxypropylene (15) (normal copolymer) sorbitan mono-laurate, polyoxyethylene (15) polyoxypropylene (5) (reverse copolymer) sorbitan mono-laurate, polyoxyethylene (10) polyoxypropylene (10) (reverse copolymer) sorbitan mono-laurate, polyoxyethylene (5) polyoxypropylene (15) (reverse copolymer) sorbitan mono-laurate, polyoxyethylene (15) polyoxypropylene (5) (random copolymer) sorbitan mono-laurate, polyoxyethylene (10) polyoxypropylene (10) (random copolymer) sorbitan mono-laurate, polyoxyethylene (5) polyoxypropylene (15) (random copolymer) sorbitan mono-laurate, polyoxyethylene (15) polyoxypropylene (5) (normal copolymer) sorbitan mono-oleate, polyoxyethylene (10) polyoxypropylene (10) (normal copolymer) sorbitan mono-oleate, polyoxyethylene (5) polyoxypropylene (15) (normal copolymer) sorbitan mono-oleate, polyoxyethylene (15) polyoxypropylene (5) (reverse copolymer) sorbitan mono-oleate, polyoxyethylene (10) polyoxypropylene (10) (reverse copolymer) sorbitan mono-oleate, polyoxyethylene (5) polyoxypropylene (15) (reverse copolymer) sorbitan mono-oleate, polyoxyethylene (15) polyoxypropylene (5) (random copolymer) sorbitan mono-oleate, polyoxyethylene (10) polyoxypropylene (10) (random copolymer) sorbitan mono-oleate, and polyoxyethylene (5) polyoxypropylene (15) (random copolymer) sorbitan mono-oleate.

More preferably, the adjuvants of the present invention may be selected from polyoxyethylene (15) polyoxypropylene (5) (reverse copolymer) sorbitan mono-laurate, and polyoxyethylene (10) polyoxypropylene (10) (reverse copolymer) sorbitan mono-laurate.

The adjuvant of the present invention can be made by methods generally known in the art for corresponding known compounds, i.e., the polysorbates. In particular, they may be made from sorbitan esters, which are known generally as a class, by reaction with ethylene oxide and/or propylene oxide usually under basic catalysis.

Base catalysis may be provided by sodium or potassium hydroxide or methoxide. The ethoxylation/propoxylation reaction may be carried out at a temperature typically from 150° C. to 180° C. and at a pressure of from 400 to 650 kPa (gauge).

The sorbitan esters, used as starting materials for the ethoxylation/propoxylation reaction making the compounds of the invention, are generally known and may themselves be made by reacting sorbitol with a suitable fatty acid to form the sorbitan ester by anhydridisation cyclisation of the sorbitol to sorbitan and esterification.

This reaction can be carried out by catalysed direct reaction of sorbitol and the fatty acid at a temperature typically from 225° C. to 250° C. and at ambient or near ambient pressure under base, acid, or buffered acid catalysis. Further information on the synthesis of this general type of surfactant can be found in standard text books on non-ionic surfactants such as Surfactant Science Volume 1: Nonionic Surfactants (pub. 1967 by Marcel Dekker) particularly the chapter by F R Benson titled "Polyol Surfactants".

Additionally the 'mono-esters' (and the corresponding ethoxylated derivatives) will include small proportions of compounds including unesterified sorbitan or sorbitan derivative (e.g., sorbitan, iso-sorbide, etc.) residues, substantial proportions of mono- and di-fatty acyl esters, mainly of sorbitan, but including modest amounts based on iso-sorbide and small proportions based on sorbitol, with some level of tri- and higher esters mainly based on sorbitan. This contrasts with the nominal triesters of sorbitan which contain major proportions of tri- and higher esters. Of course the range of individual compounds after alkoxylation will be even greater.

On initial esterification, it may be understood that the majority of the acyl residues react with primary hydroxyls in the sorbitan or sorbitan derivatives (corresponding to the 1- or 6-positions in sorbitol), but that during subsequent processing trans-esterification largely randomises the position of the acyl group(s). The alkoxylation may involve further trans-esterification for further randomising the acyl positions.

The adjuvants of the present invention preferably have cloud point of greater than 10° C. Preferably, greater than 20° C. More preferably, greater than 30° C. Further preferably, greater than 35° C. Most preferably, greater than 40° C.

The method of determining cloud point is as described herein using a 1 wt. % aqueous dilute solution of adjuvant.

The contact angle of an agrochemical formulation represents a profile measurement of a drop of the formulation when in contact with a solid surface. When a surfactant is added to water the surface tension of the solution is reduced and the droplet is therefore able to spread out over a greater leaf area. This flatter droplet has a lower contact angle. It is typically understood that a water droplet has a contact angle of >100° on parafilm, whilst a solution including a desired adjuvant will have a contact angle of 80° or less.

The contact angle of the adjuvant per se of the present invention is preferably less than 70°. More preferably, less than 68°. Most preferably, less than 66°. The method of determining contact angle is as described herein using a 0.2 wt. % aqueous dilute solution of adjuvant.

A reduction of surface tension is desired as it would indicate an improved spreading of each droplet on the target surface which would lead to better uptake. The adjuvants of the present invention are found to provide desired surface tension.

The equilibrium surface tension (EST) of the adjuvant of the present invention is preferably less than 40 mN/n. More preferably, less than 38 mN/n. Further preferably, less than 35 mN/n. Most preferably, less than 33 mN/n.

The method of determining equilibrium surface tension is as described herein using a 0.1 wt. % aqueous dilute solution of adjuvant.

The lower surface tension values confirm desirable performance as non-ionic surfactant adjuvants. Lower dynamic surface tension (DST) for a material of the same molecular size or greater (as is the case of the materials of the present invention) provide improved properties related to increased droplet retention on leaf surfaces, and in combination with a lower contact angle, will provide improved spreading. The end result of this is increased leaf surface coverage.

The dynamic surface tension of the adjuvant of the present invention at 0.2 wt. % and at 5 ms is preferably less than 75 mN/n. More preferably, less than 70 mN/n. Most preferably, less than 65 mN/n.

The dynamic surface tension of the adjuvant of the present invention at 0.2 wt. % and at 80 ms is preferably less than 73 mN/n. More preferably, less than 67 mN/n. Most preferably, less than 64 mN/n.

The dynamic surface tension of the adjuvant of the present invention at 0.2 wt. % and at 1,250 ms is preferably less than 60 mN/n. More preferably, less than 55 mN/n. Most preferably, less than 50 mN/n.

The method of determining dynamic surface tension is as described herein using 0.2 wt. % diluted adjuvant in water.

Together, the series of observed physical property improvements in EST, contact angle, and DST, are generally considered important for improving the performance of contact insecticides and fungicides.

The adjuvants of the present invention are polymeric and generally of larger size whereas the more common approach for reducing DST is to make the surfactant molecule smaller and more mobile at a rapidly expanding interface as well as either shrinking or branching the hydrophobe. The observed performance differentiates them from other surface active compounds used to reduce the DST of agricultural spray mixtures.

Adjuvants of the present invention yield the described dynamic effect. In addition, by maintaining molecular weight above 1000 Daltons may provide other significant toxicological and eco-toxicological benefits.

The interfacial surface tension of the adjuvant of the present invention is preferably in the range from 1.0 mN/n to 8.0 mN/n. More preferably, in the range from 1.5 mN/n to 7.0 mN/n. Further preferably, in the range from 1.8 mN/n to 6.4 mN/n. Most preferably, in the range from 2.0 mN/n to 6.2 mN/n.

The method of determining interfacial surface tension is as described herein using a 0.2 wt. % aqueous dilute solution of adjuvant.

The viscosity of the adjuvant, at 5° C. and at shear rate of $100\ s^{-1}$, may be in the range from about 1000 mPa·s to about 1500 mPa·s. Preferably, the viscosity is in the range from about 1020 mPa·s to about 1400 mPa·s. Most preferably, the viscosity is in the range from about 1050 mPa·s to about 1350 mPa·s.

The viscosity value of the adjuvant, at 25° C. and at shear rate of $100\ s^{-1}$, may be in the range from about 200 mPa·s to about 500 mPa·s. Preferably, the viscosity is in the range from about 220 mPa·s to about 400 mPa·s. Most preferably, the viscosity is in the range from about 250 mPa·s to about 350 mPa·s.

The viscosity value of the adjuvant, at 40° C. and at shear rate of $100\ s^{-1}$, may be in the range from about 100 mPa·s to about 200 mPa·s. Preferably, the viscosity is in the range from about 105 mPa·s to about 150 mPa·s. More preferably, the viscosity is in the range from about 110 mPa·s to about 145 mPa·s.

The method of determining viscosity is as described herein using neat adjuvant.

The ratio of the viscosity value at 5° C. to the value at 40° C. represents the variation in the viscosity across the temperature range. The ratio of the viscosity value at 5° C. to the value at 40° C., may be in the range from 7 to 14:1. Preferably, in the range from 8 to 13:1. Most preferably, in the range from 9 to 11:1.

It has been found that the use of an adjuvant of the present invention advantageously provides reduced viscosity across a range of temperatures for the liquid product, along with easing dilution which is measured as a dissolution rate in cold water.

The adjuvants of the present invention therefore have low viscosity and provide for ready dilution in colder waters without the need for inclusion of either alcohols or glycols. The adjuvant may advantageously provide for a composition having low viscosity in an aqueous medium, and no observable gelling at higher concentrations. The adjuvant desirably has suitable storage stability and viscosity appropriate to the end use.

The adjuvants of the present invention are found to dilute more readily in agricultural concentrate. This improved dilution of the adjuvants of the present invention is particularly desired in colder water.

The cold water dilution time of the adjuvant of the present invention is preferably less than 80 seconds. More preferably, less than 60 seconds. Most preferably, less than 50 seconds.

The method of determining cold water dilution time is as described herein using a 1 wt. % aqueous dilute solution of adjuvant.

The adjuvants of the present invention also provide for good and/or reduced foam stability.

Advantageously this foam stability may provide for reduction in the need for foam control agents in the formulation.

The initial foam height of the adjuvant of the present invention is preferably less than 50 mm. More preferably, less than 40 mm. Most preferably, less than 25 mm.

The foam height at 30 minutes of the adjuvant of the present invention is preferably less than 30 mm. More preferably, less than 20 mm. Most preferably, less than 12 mm.

The foam height at 60 minutes of the adjuvant of the present invention is preferably less than 20 mm. More preferably, less than 12 mm. Most preferably, less than 9 mm.

The method of determining foam height is as described herein using a 1 wt. % aqueous dilute solution of adjuvant.

The hydrophilic-lipophilic balance (HLB) scale ranges from 0 to 20, with 0 for a completely lipophilic molecule and 20 for a completely hydrophilic molecule. The function of surfactants can be generally described by then HLB number, for example, de-foaming surfactants have an HLB range of 1-3, water-in-oil emulsifiers have an HLB range of 3-6, wetting agents have an HLB range of 7-9, oil-in-water emulsifiers have an HLB range of 8-18, detergents have an HLB range of 13-15, and solubilisers have an HLB range of 15-18.

Surfactants with low HLB are not considered soluble in water. They are considered dispersible in water, and may form a dispersed phase spontaneously without agitation.

The adjuvants of the present invention preferably have a HLB value, as calculated by Griffin's method, of less than 17, more preferably less than 15, and most preferably less than 13. The adjuvants of the present invention suitably have a HLB value in the range from 5 to 15, preferably 8 to 14, more preferably 10 to 13.

The properties of the adjuvant per se will be understood to provide the same advantageous advantages for an agrochemical formulation comprising said adjuvant. Therefore, an agrochemical formulation is provided, when comprising the adjuvant of the present invention, having the advantages of the properties of the adjuvant per se.

Agrochemically active compounds, including insecticides and fungicides, require a formulation which allows the active compounds to be taken up by the plant/the target organisms.

The term 'agrochemical formulation' as used herein refers to compositions including an active agrochemical, and is intended to include all forms of compositions, including concentrates and spray formulations. If not specifically stated, the agrochemical formulation of the present invention may be in the form of a concentrate, a diluted concentrate, or a sprayable formulation.

The adjuvant of the present invention may be combined with other components in order to form an agrochemical formulation comprising at least one agrochemical active.

Accordingly, agrochemical active compounds may be formulated as an emulsifiable concentrate (EC), emulsion concentrate (EW), suspension concentrate (SC), soluble liquid (SL), as an oil-based suspension concentrate (OD), and/or suspoemulsions (SE).

In an EC formulation and in an SL formulation, the active compound may be present in dissolved form, whereas in an OD, SC, EW, or SE formulations the active compound may be present as a solid or emulsified liquid.

It is envisaged that the adjuvant of the present invention will particularly find use in a EC, EW, SC, SL, OD, or SE formulation.

Agrochemical concentrates are agrochemical compositions, which may be aqueous or non-aqueous, and which are designed to be diluted with water (or a water based liquid) to form the corresponding spray formulations. Said compositions include those in liquid form (such as solutions, emulsions, or dispersions) and in solid form (especially in water dispersible solid form) such as granules or powders.

Spray formulations are aqueous agrochemical formulations including all the components which it is desired to apply to the plants or their environment. Spray formulations can be made up by simple dilution of concentrates containing desired components (other than water), or by mixing of the individual components, or a combination of diluting a concentrate and adding further individual components or mixtures of components. Typically such end use mixing is carried out in the tank from which the formulation is sprayed, or alternatively in a holding tank for filling the spray tank. Such mixing and mixtures are typically termed tank mixing and tank mixtures.

The adjuvant may therefore be incorporated into the formulation of the agrochemical active compound (in-can/built-in formulation) or be added after dilution of the concentrated formulation of the spray liquor (tank-mix). To avoid dosage errors and to improve user safety during application of agrochemical products, it is advantageous to incorporate the adjuvant into the formulation. This also avoids the unnecessary use of additional packaging material for the tank-mix products.

According to the needs of the customer, concentrates thus formed may comprise typically up to 95 wt. % agrochemical actives. Said concentrates may be diluted for use resulting in a dilute composition having an agrochemical active concentration of about 0.5 wt. % to about 1 wt. %. In said dilute composition (for example, a spray formulation, where a spray application rate may be from 10 to 500 $l \cdot ha^{-1}$) the agrochemical active concentration may be in the range from about 0.001 wt. % to about 1 wt. % of the total formulation as sprayed.

The adjuvant of the present invention will typically be used in an amount proportional to the amount of the active agrochemical in the formulation. In agrochemical formulation concentrates, the proportion of the adjuvant will depend on the solubility of the components in the liquid carrier. Typically, the concentration of the adjuvant in such a concentrate will be from 1 wt. % to 99 wt. %. Preferably, from 1 wt. % to 70 wt. %. More preferably, from 3 wt. % to 50 wt. %.

Upon dilution to form, for example, a spray formulation, the adjuvant will typically be present at a concentration of from 0.01 wt. % to 2 wt. %, more usually from 0.03 wt. % to 0.5 wt. % of the spray formulation. Further preferably, from 0.12 wt. % to 0.4 wt. % of the spray formulation.

The ratio of adjuvant to active agrochemical in the agrochemical formulation is preferably from about 0.1:1 to about 1:1. More preferably, from about 0.3:1 to about 0.8:1. This ratio range will generally be maintained for concentrate forms of formulations (e.g., where the adjuvant is included in a dispersible liquid concentrate or dispersible solid granule formulation), and in the spray formulations.

When concentrates (solid or liquid) are used as the source of active agrochemical and/or adjuvant, the concentrates will typically be diluted to form the spray formulations. The dilution may be from 1 to 10,000, particularly 10 to 1,000, times the total weight of the concentrate of water to form the spray formulation.

Where the agrochemical active is present in the aqueous end use formulation as solid particles, most usually it will be present as particles mainly of active agrochemical. However, if desired, the active agrochemical can be supported on a solid carrier, e.g., silica or diatomaceous earth, which can be solid support, filler or diluent material as mentioned above.

The spray formulations will typically have a pH within the range from moderately acidic (e.g., about 3) to moderately alkaline (e.g., about 10), and particular near neutral (e.g., about 5 to 8). More concentrated formulations will have similar degrees of acidity/alkalinity, but as they may be largely non-aqueous, pH is not necessarily an appropriate measure of this.

The agrochemical formulation may include solvents (other than water) such as monopropylene glycol, oils which can be vegetable or mineral oils such as spray oils (oils included in spray formulations as non-surfactant adjuvants), associated with the first and co-adjuvants. Such solvents may be included as a solvent for the adjuvant, and/or as a humectant, e.g., especially propylene glycol. When used such solvents will typically be included in an amount of from 5 wt. % to 500 wt. %, desirably 10 wt. % to 100 wt. %, by weight of the adjuvant. Such combinations can also include salts such as ammonium chloride and/or sodium benzoate, and/or urea especially as gel inhibition aids.

The agrochemical formulation may also include other components as desired. These other components may be selected from those including:

binders, particularly binders which are readily water soluble to give low viscosity solutions at high binder concentrations, such as polyvinylpyrrolidone; polyvinyl alcohol; carboxymethyl cellulose; gum arabic; sugars, e.g., sucrose or sorbitol; starch; ethylene-vinyl acetate copolymers, sucrose and alginates, diluents, absorbents or carriers such as carbon black; talc; diatomaceous earth; kaolin; aluminium, calcium or magnesium stearate; sodium tripolyphosphate; sodium tetraborate; sodium sulphate; sodium, aluminium and mixed sodium-aluminium silicates; and sodium benzoate, disintegration agents, such as surfactants, materials that swell in water, for example carboxy methylcellulose, collodion, polyvinylpyrrolidone and microcrystalline cellulose swelling agents; salts such as sodium or potassium acetate, sodium carbonate, bicarbonate or sesquicarbonate, ammonium sulphate and dipotassium hydrogen phosphate;

wetting agents such as alcohol ethoxylate and alcohol ethoxylate/propoxylate wetting agents;

dispersants such as sulphonated naphthalene formaldehyde condensates and acrylic copolymers such as the comb copolymer having capped polyethylene glycol side chains on a polyacrylic backbone;

emulsifiers such as alcohol ethoxylates, ABA block co polymers, or castor oil ethoxylates;

antifoam agents, e.g., polysiloxane antifoam agents, typically in amounts of 0.005 wt. % to 10 wt. % of the formulation;

viscosity modifiers such as commercially available water soluble or miscible gums, e.g., xanthan gums, and/or cellulosics, e.g., carboxy-methyl, ethyl or propylcellulose; and/or preservatives and/or anti-microbials such as organic acids, or their esters or salts such as ascorbic, e.g., ascorbyl palmitate, sorbic, e.g., potassium sorbate, benzoic, e.g., benzoic acid and methyl and propyl 4-hydroxybenzoate, propionic, e.g., sodium propionate, phenol, e.g., sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the formulation.

The agrochemical formulation according to the present invention may also contain components, such as surfactant materials which form part of the emulsifier system. Said surfactants may include surfactant dispersants.

Other adjuvants not within the scope of the present invention, such as surfactant adjuvants, may be included in the compositions and formulations of and used in this invention. Examples include alkylpolysaccharides (more properly called alkyl oligosaccharides); fatty amine ethoxylates, e.g., coconut alkyl amine 2EO; and derivatives of alk(en)yl succinic anhydride, in particular those described in PCT applications WO 94/00508 and WO 96/16930.

Suitable agrochemical actives for use in the formulations according to the invention are all agrochemically active compounds that may be solid or liquid at room temperature. It is envisaged that the adjuvant of the present invention would have broad applicability to all types of agrochemical actives.

Agrochemical actives refer to biocides which, in the context of the present invention, are plant protection agents, more particular chemical substances capable of killing different forms of living organisms used in fields such as medicine, agriculture, forestry, and mosquito control. Also counted under the group of biocides are so-called plant growth regulators.

Biocides for use in agrochemical formulations of the present invention are typically divided into two sub-groups:

pesticides, including fungicides, herbicides, insecticides, algicides, moluscicides, miticides and rodenticides, and antimicrobials, including germicides, antibiotics, antibacterials, antivirals, antifungals, antiprotozoals and antiparasites.

In particular, biocides selected from insecticides, fungicides, or herbicides may be particularly preferred.

The term 'pesticide' will be understood to refer to any substance or mixture of substances intended for preventing, destroying, repelling, or mitigating any pest. A pesticide may be a chemical substance or biological agent (such as a virus or bacteria) used against pests including insects, plant pathogens, weeds, mollusks, birds, mammals, fish, nematodes (roundworms) and microbes that compete with humans for food, destroy property, spread disease or are a nuisance. In the following examples, pesticides suitable for the agrochemical compositions according to the present invention are given.

A fungicide is a chemical control of fungi. Fungicides are chemical compounds used to prevent the spread of fungi in gardens and crops. Fungicides are also used to fight fungal infections. Fungicides can either be contact or systemic. A contact fungicide kills fungi when it comes into contact with the fungicide retained on leaf surfaces. A systemic fungicide is absorbed into plant tissues and kills the fungus when it attempts to invade the host.

Examples for suitable fungicides, according to the present invention, encompass the following species: (3-ethoxypropyl)mercury bromide, 2-methoxyethylmercury chloride, 2-phenylphenol, 8-hydroxyquinoline sulphate, 8-phenylmercuri oxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulphide, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, blasticidin-S, Bordeaux mixture, boscalid, bridged diphenyl fungicides, bromuconazole, bupirimate, Burgundy mixture, buthiobate, butylamine, calcium polysulphide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper (II) carbonate, basic, copper fungicides, copper hydroxide, copper naphthenate, copper oleate, copper oxychloride, copper(II) sulphate, copper sulphate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dicarboximide fungicides, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, dinitrophenol fungicides, dinobuton, dinocap, dinocton, dinopenton, dinosulphon, dinoterbon, diphenylamine, dipyrithione, disulphiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulph, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fludioxonil, flumetover, fluopicolide, fluoroimide, fluotrimazole, fluoxastrobin, fluquinconazole, flusilazole, flusulphamide, flutolanil, flutriafol, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isoprothiolane, isovaledione, kasugamycin, kresoxim-methyl, lime sulphur, mancopper, mancozeb, maneb, mebenil, mecarbinzid, mepanipyrim, mepronil, mercuric chloride, mercuric oxide, mercurous chloride, mercury fungicides, metalaxyl, metalaxyl-M, metam, metazoxolon, metconazole, methasulphocarb, methfuroxam, methyl bromide, methyl isothiocyanate, methylmercury benzoate, methylmercury dicyandiamide, methylmercury pentachlorophenoxide, metiram, metominostrobin, metrafenone, metsulphovax, milneb, morpholine fungicides, myclobutanil, myclozolin, N-(ethylmercury)-p-toluenesulphonanilide, nabam, natamycin, nitro styrene, nitrothal-isopropyl, nuarimol, OCH, octhilinone, ofurace, organomercury fungicides, organophosphorus fungicides, organotin fungicides, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulphamide fungicides, phosdiphen, phthalide, phthalimide fungicides, picoxystrobin, piperalin, polycarbamate, polymeric dithiocarbamate fungicides, polyoxins, polyoxorim, polysulphide fungicides, potassium azide, potassium polysulphide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfiir, pyrrole fungicides, quinacetol, quinazamid, quinconazole, quinoline fungicides, quinone fungicides, quinoxaline fungicides, quinoxyfen, quintozene, rabenzazole, salicylanilide, silthiofam, simeconazole, sodium azide, sodium orthophenylphenoxide, sodium pentachlorophenoxide, sodium polysulphide, spiroxamine, streptomycin, strobilurin fungicides, sulphonanilide fungicides, sulphur, sultropen, TCMTB, tebuconazole, tecloftalam, tecnazene, tecoram, tetraconazole, thiabendazole, thiadifluor, thiazole fungicides, thicyofen, thifluzamide, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, trifloxystrobin, triflumizole, triforine, triticonazole, unclassified fungicides, undecylenic acid, uniconazole, urea fungicides, validamycin, valinamide fungicides, vinclozolin, zarilamid, zinc naphthenate, zineb, ziram, zoxamide, and mixtures thereof.

An herbicide is a pesticide used to kill unwanted plants. Selective herbicides kill specific targets while leaving the desired crop relatively unharmed. Some of these act by interfering with the growth of the weed and are often based on plant hormones. Herbicides used to clear waste ground are non-selective and kill all plant material with which they come into contact. Herbicides are widely used in agriculture and in landscape turf management. They are applied in total vegetation control (TVC) programs for maintenance of highways and railroads. Smaller quantities are used in forestry, pasture systems, and management of areas set aside as wildlife habitat.

Suitable herbicides may be selected from the group comprising: aryloxycarboxylic acid, e.g., MCPA, aryloxyphenoxypropionates, e.g., clodinafop, cyclohexanedione oximes, e.g., sethoxydim, hydroxybenzonitriles, e.g., bromoxynil, sulphonylureas, e.g., nicosulphuron, triazolopyrimidines, e.g., penoxsulam, triketiones, e.g., mesotriones, triazine herbicides such as metribuzin, hexaxinone, or atrazine; sulphonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxyacetic acids; diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; and/or dihalobenzonitrile herbicides such as bromoxynil, or ioxynil, benzoic acid herbicides, dipyridilium herbicides such as paraquat; and other herbicides such as clomazone, carfentrazone, saflufenacil, and pyroxasulphone.

Particularly preferred herbicides may be selected from 2,4-dichlorophenoxyacetic acid (2,4-D), atrazine, dicamba as benzoic acid, glyphosate, glufosinate, imazapic as imidazolinone, metolachlor as chloroacetamide, picloram, clopyralid, and triclopyr as pyridinecarboxylic acids or synthetic auxins, their respective water soluble salts and esters, and mixtures thereof.

An insecticide is a pesticide used against insects in all developmental forms, and include ovicides and larvicides used against the eggs and larvae of insects. Insecticides are used in agriculture, medicine, industry and the household.

Suitable insecticides may include those selected from: chlorinated insecticides such as, for example, Camphechlor, DDT, Hexachloro-cyclohexane, gamma-Hexachlorocyclohexane, Methoxychlor, Pentachlorophenol, TDE, Aldrin, Chlordane, Chlordecone, Dieldrin, Endosulphan, Endrin, Heptachlor, Mirex and their mixtures; organophosphorous compounds such as, for example, Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulphoton, Ethoprop, Fenamiphos, Fenitrothion, Fenthion, Fosthiazate, Malathion, Methamidophos, Methidathion, Methyl-parathion, Mevinphos, Naled, Omethoate, Oxydemeton-methyl, Parathion, Phorate, Phosalone, Phosmet, Phostebupirim, Pirimiphos-methyl, Profenofos, Terbufos, Tetrachlorvinphos, Tribufos, Trichlorfon and their mixture; carbamates such as, for example, Aldicarb, Carbofuran, Carbaryl, Methomyl, 2-(1-Methylpropyl) phenyl methylcarbamate and their mixtures; pyrethroids such as, for example, Allethrin, Bifenthrin, Deltamethrin, Permethrin, Resmethrin, Sumithrin, Tetramethrin, Tralomethrin, Transfluthrin and their mixtures; plant toxin derived compounds such as, for example, Derris (rotenone), Pyrethrum, Neem (Azadirachtin), Nicotine, Caffeine and their mixture; neonicotinoids such as imidacloprid; abamectin e.g., emamactin; oxadiazines such as indoxacarb; and/or anthranilic diamides such as rynaxypyr.

Miticides are pesticides that kill mites. Antibiotic miticides, carbamate miticides, formamidine miticides, mite growth regulators, organochlorine, permethrin and organophosphate miticides all belong to this category. Molluscicides are pesticides used to control mollusks, such as moths, slugs and snails. These substances include metaldehyde, methiocarb and aluminium sulphate. A nematicide is a type of chemical pesticide used to kill parasitic nematodes (a phylum of worm).

Most preferably, the active present in the agrochemical formulation of the present invention is selected from 2,4-D, glyphosate, dicamba, or dipyridilium herbicides The invention further includes a method of treating plants using formulations including at least one agrochemical and the adjuvant of the first aspect. The agrochemical may be one or more phytoactives, for example growth regulators and/or herbicides, and/or pesticides, for example insecticides, fungicides or acaricides.

Accordingly the invention further includes methods of use including:
- a method of killing or inhibiting vegetation by applying to the vegetation, or the immediate environment of the vegetation, e.g., the soil around the vegetation, a spray formulation including at least one dispersed phase agrochemical and the adjuvant of the first aspect; and/or
- a method of killing or inhibiting pests of plants by applying to the plants or the immediate environment of the plants, e.g., the soil around the plants, a spray formulations including at least one dispersed phase agrochemical which is one or more pesticides, for example insecticides, fungicides or acaricides, and the adjuvant of the first aspect.

The adjuvant of the present invention will provide adjuvancy to the agrochemical formulation in which it is comprised.

As used herein, the term 'adjuvant' or 'adjuvancy' refers to compounds which when added to an agrochemical formulation will improve the agrochemical's desired effect. The adjuvant may affect the diluent, the mixture, the active, or the target by its improvements of the active's performance. An adjuvant can be used to adhere the pesticide on the area where the pesticide is functional, change the epidermal layer of the leaf surface permitting pesticide entry; and/or attract the target pest to the pesticide as when used as a food for the pest in baits.

Specific adjuvancy effects may include surfactants, emulsifiers (dispersants and suspending agents), oils, emulsifiable oils, compatibility agents, buffering and conditioning agents, defoaming agents, deposition agents, drift control agents, thickeners, spreaders (wetters), stickers (builders and extenders), plant penetrants, translocators, soil penetrants, and/or stabilising agents (UV filters).

Preferably, the adjuvant of the present invention may find use as either the sole component or principal functioning agent in non-ionic surfactant adjuvants formulated either for tank-added use, or formulated directly into pesticide concentrates.

The materials of the present invention dilute more readily in agricultural concentrates and develop lower fluid viscosities in aqueous systems, either in the concentrate or upon dilution into water prior to spraying. This behaviour provides improved ease of use in both manufacturing and upon dilution of products containing them, especially in colder waters. Reduction of foam stability is also observed which reduces the need for foam control agents.

The adjuvant of the present invention may be added to agrochemical formulations without undesirable thickening or destabilisation.

In addition to exhibiting the desired physical properties, surprisingly the adjuvant performance in spray mixture with glyphosate and ammonium sulphate for many of these substances was statistically equivalent to or better than the performance of existing adjuvants such as polysorbate 20 (Tween 20) or polysorbate 80 (Tween 80).

The adjuvants of the present invention may provide for desired stability of the resulting agrochemical formulations. The formulations do not undergo separation under storage. Additionally, the agrochemical formulations return to being homogeneous liquids at room temperature after being frozen.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e., 25° C.), unless otherwise stated herein, or unless otherwise stated in the referenced test methods and procedures.

The following test methods were used to determine performance of the adjuvant compositions.

Cloud Point

At 1 wt. % of the adjuvant in deionised water when heated at a definite temperature, the adjuvant may start to precipitate out of solution. The temperature at which this happens is the cloud point. The cloud point is therefore determined at an aqueous dilution of 1 wt. % adjuvant.

To determine the cloud point 10 g of the adjuvant was added to 90 g of deionised water, and stirred vigorously until the adjuvant was completely mixed and dissolved. This 10 wt. % dilution was then further diluted by a factor of 10 by removing 10 g and addition to 90 g of deionised water to give a 1 wt. % aqueous dilution of the adjuvant.

Approximately 20 ml of the final diluted solution was separated off in to a disposable culture tube. A hot water bath was prepared with the water in the bath maintained at a temperature at approximately 10° C. above the expected cloud point. The culture tube was placed into the hot water bath under stirring and with a thermometer. The dilute solution, which is clear at room temperature, gradually becomes hazy and then suddenly becomes cloudy. The temperature at which the solution becomes cloudy is the cloud point. The measurement of the cloud point was repeated until two identical temperatures were obtained.

Contact Angle

Aqueous solutions of each sample material were prepared at a concentration of 0.2% (w/w). Burdick & Jackson HPLC grade water was used. The samples were shaken by hand and allowed to equilibrate for 24 hours.

Measurements of the contact angle of each solution on Parafilm were made using a Ramé-Hart, Inc. NRL C.A. goniometer, model number 100-00-115. A thin strip of Parafilm was affixed to a microscope slide using double stick tape; the protective barrier on the Parafilm was removed after applying the Parafilm to the tape. Droplets 5 microliters in volume were applied to the Parafilm using a micropipette. The contact angle of each droplet was measured immediately upon application by visually aligning the cross-hairs of the goniometer along the tangent of the droplet/substrate/air interface. Contact angles on each side of ten droplets were measured. These values were averaged to determine the value reported.

Equilibrium Surface Tension

Surface tension measurements were made using a Kruss model K10ST tensiometer with a Wilhelmy plate. The temperature of the sample chamber was controlled at 25.0° C.±0.1° C. using a VWR model 1156D refrigerated/heated circulating water bath.

The performance of the instrument was verified by measuring the surface tension of HPLC-grade water prior to making measurements on sample solutions. Approximately ⅔ of clean measurement unit was filled with HLPC grade water to establish baseline surface tension for water alone without surfactant (72.8 mN/n).

Aqueous solutions of each sample material were prepared at concentrations of 0.1 wt. % and 0.2 wt. %. Burdick & Jackson HPLC grade water was used. The samples were subject to manual agitation, and allowed to equilibrate for at least 24 hours.

Approximately 20 ml of sample solution was gently poured into a sample dish and placed in the instrument sample holder. The evolution of surface tension was monitored for fifteen minutes, by which time it was determined that equilibrium had been effectively attained. The value of surface tension at this time was recorded. Measurements on at least two aliquots were made and the average value was reported.

Dynamic Surface Tension

DST was determined using standard ASTM D3825-09 "Standard Test Method for Dynamic Surface Tension by the Fast-Bubble Technique" with 0.2 wt. % aqueous dilution of adjuvant at ambient temperature.

Interfacial Tension

Interfacial tension measurements were made using a Kruss model K10ST tensiometer with a Du Nouy ring. The temperature of the sample chamber was controlled at 25.0° C.±0.1° C. using a VWR model 1156D refrigerated/heated circulating water bath.

Aqueous solutions of each sample material were prepared at concentration of 0.2 wt. %. Burdick & Jackson HPLC grade water was used. The samples were subject to manual agitation, and allowed to equilibrate for at least 24 hours.

The tension of the interface between each of the aqueous solutions and methyl soyate was measured. The instrument was first zeroed with the Du Nouy ring attached and submerged below approximately 15 ml of methyl soyate to correct for the buoyancy of the ring in this oil. The ring was then cleaned by rinsing with isopropyl alcohol and water, followed by heating in a flame until glowing red; this same procedure for cleaning the ring was followed before each subsequent measurement.

The aqueous sample solution was then gently poured into a clean sample dish to a depth of about half full (approximately 20 ml) and placed in the instrument sample holder. The cleaned ring was submerged below the air/water surface and approximately 15 ml of methyl soyate was gently layered on top using a pipette. A measurement of the interfacial tension was made as the ring was pulled through the oil/water interface at a vessel speed setting of 5.

When using the Du Nouy ring, the displayed interfacial tension value was corrected to account for the weight of the liquid suspended beneath the ring. This was accomplished by multiplying the instrument reading by the product of a constant multiplied by a correction factor (as described in Chapter 1 of the Enclosure to the Kruss K10T User's Manual). The correction factor depends on the ring dimensions, the difference in the densities of the oil and water phases, and the recorded interfacial tension value. The expression for the correction factor is:

$$F = 0.725 + \sqrt{0.4036 \cdot 10^{-3} \cdot \frac{\sigma^*}{(D-d)} + 0.0128}$$

In this expression, D is the density of the aqueous phase (1 g/cm³ in this case), d is the density of the oil phase (0.8815 g/cm³ in this case), and σ* is the interfacial tension (mN/m) value displayed on the instrument. The corrected interfacial tension, reported herein, is the value displayed on the instrument multiplied by 1.07 times the correction factor calculated using the expression above.

Viscosity

The viscosity describes fluids compressibility. Viscosity was measured directly on neat liquid adjuvant at a series of temperatures by placing it into the viscometer and taking viscosity measurements according to the device manufacturer's guidance.

Viscosities are determined with a spinning spindle. Viscosity of neat samples was measured on TA ARG2 Rheometer by TA Instruments. A concentric cylinder geometry was used. Measurements were made at three sample temperatures of 5° C., 25° C., and 40° C., with the temperature being controlled using a Peltier device using a 2° 35 mm titanium cone against a plate with a 104 nm gap. Samples were allowed to equilibrate at the relevant temperature for 210 seconds before measurements were taken. A viscosity curve was then recorded, with the instrument operating in a rate-controlled flow mode.

A steady-state flow procedure was followed. After a target shear rate was achieved, the required stress was monitored; when two consecutive 10 second readings were within 10% of each other equilibrium was judged to have been reached and the corresponding viscosity value was recorded. The viscosity values stated herein are at a shear rate of 100 s$^{-1}$.

Foam Volume

The foam volume was determined by firstly making 342 ppm hard water from stock solution. A 100 ml graduated cylinder is then filled with hard water and tested at both 1 wt. % and 2.5 wt. % (i.e., 99 g of 342 ppm hard water with 1 g of neat test material to form the 1% solutions and 97.5 g of 342 ppm hard water with 2.5 g of neat test material to form the 2.5% solutions).

The filled cylinder was inverted 30 times during a 30 second period, with inversions being smooth in order to minimise air entrainment. The resulting foam height (initial foam height) was measured in mm with a graduated ruler. The cylinder was then left to stand undisturbed for 30 minutes and foam height measurements were taken. The cylinder was left to stand for further time periods of 1 hour, 4 hours, and 24 hours, and foam height measurements taken if foam was still present.

Cold Water Dilution

The cold water dilution time was determined by firstly setting up the beakers/stirrers as required for sample set to be evaluated. Chilled distilled water with ice was added to a one gallon glass jar.

A repeating pipettor (Eppendorf Repeater Plus with Eppendorf 10 mL syringe) was set to 2.5 (equivalent to 0.5 mL). The pipette was loaded with the sample to be tested, and an initial amount was ejected from the tip of the syringe to remove any air bubbles. A test ejection of the pipette at 2.5 was prepared by adjusting the pipette accordingly so approximately 0.5 g is dispensed.

The ice in the water was removed by straining using a Buchner funnel leaving the water at around 4-7° C. 99.5 g of the water was measured out in to a 150 mL beaker. A stirring bar was added, and the cold water containing beaker was placed on the VWR Dyla-Dual Hotplate-Spinner with the magnetic stirrer to approximately 3.25. The temperature of the agitated water was recorded with a Fisher Scientific Accument Basic AB15 pH meter.

The sample from the pipette was aimed at the outside of the vortex in the water, and the adjuvant sample ejected over a time period of less than 10 seconds. The stopwatch for timing the dilution was begun as the slider of the pipette reached the bottom of its motion. The dissolution of the adjuvant in the water was observed, and the time to complete dissolution was recorded. If the adjuvant was not dissolved by 3 minutes the time was recorded as >180 seconds. Other observations such as gelling, sticking to walls, or sticking to the vortex were recorded. The temperature of the complete dilution was recorded.

HLB

Adjuvant surfactants are amphiphilic molecules that concentrate at the interface between two phases and modify the properties of that interface. The hydrophilic-lipophilic balance (HLB) of a surfactant is measured on an empirical scale developed by Griffin (W. C. Griffin, J. Cosmet. Chem., 1, 311, 1949).

Example Synthesis of Adjuvant

The adjuvants of the examples were prepared from sorbitol in process where water is initially removed from sorbitol to form a sorbitan (a cyclic sorbitol anhydride), the sorbitan is then partially esterified with a fatty acid, and the desired amount of EO/PO is chemically added in the presence of a catalyst to yield the polysorbate.

The following three synthesis methods are for making adjuvants comprising an equal ratio of EO to PO of 10 moles each per molecule. The methods each start with a clean dry 3 litre pressure vessel that was equipped with agitation, a nitrogen sparge, thermometer, and vacuum. 750 g (1.7 mol) of sorbitan mono-laurate (SML) and 5.6 g (0.04 mol dry) of 45% potassium hydroxide were charge to the vessel at ambient temperature. Where sorbitan mono-oleate (SMO) based adjuvants were made, SML was substituted with 950 g (1.5 mol) SMO.

The vessel was then purged with nitrogen. The vessel was heated to 110° C. with agitation and vacuum was applied for one hour to dry the batch.

The batches of sorbitan ester were then reacted according to one of the following three methods depending on whether a reverse, random, or normal copolymer was desired.

For Normal Block Copolymers (Propylene Oxide First, React Down, then Ethoxylation):

The batch was heated to 130° C. Propylene oxide (995.7 g) was fed such that the temperature mole ratio and pressure were maintained at 130° C. and below 45 psi. After the PO feed was completed the temperature was raised to 160° C. At 160° C. ethylene oxide (755.2 g) was fed such that the temperature and pressure were maintained at 160° C. and below 45 psi.

For Reverse Block Copolymers (Ethylene Oxide First, React Down, then Propoxylation):

The batch was heated to 160° C. Ethylene oxide (755.2 g) was feed such that the temperature and pressure were maintained at 160° C. and below 45 psi. After the EO feed was completed the temperature was lowered to 130° C. At 130° C. propylene oxide (995.7 g) was fed such that the temperature and pressure were maintained at 130° C. and below 45 psi.

For Random Copolymers (Propylene Oxide Mixtures with Ethylene Oxide):

The batch was heated to 160° C. Ethylene oxide (668.5 g) and propylene oxide (881.4 g) were fed alternately such that equal amounts of EO/PO were maintained during the additions and the temperature and pressure were maintained at 160° C. and below 45 psi.

In all cases after the oxide additions were completed the batches were allowed to react until a constant pressure was achieved. After constant pressure was achieved the SML normal and SMO random were allowed to react for an additional hour. The temperature of the SML reverse batch was raised to 160° C. and held for two hours. When the additional time had elapsed the batches were cooled to 110° C. and vacuum stripped for one hour. After the one hour strip the batch was cooled to 65° C. and the batches were neutralised with lactic acid to a pH of 5.5-7.5 and discharged.

The following adjuvants were synthesised according to the above method.

TABLE 1

Adjuvants synthesised

| Adjuvant | Ester | No. of Moles of PO | No. of Moles of EO | Copolymer Type |
|---|---|---|---|---|
| A1 | SML | 5 | 15 | Normal |
| A2 | SML | 10 | 10 | Normal |
| A3 | SML | 15 | 5 | Normal |
| A4 | SML | 5 | 15 | Reverse |
| A5 | SML | 10 | 10 | Reverse |
| A6 | SML | 15 | 5 | Reverse |
| A7 | SML | 5 | 15 | Random |
| A8 | SML | 10 | 10 | Random |
| A9 | SML | 15 | 5 | Random |
| A10 | SMO | 5 | 15 | Random |
| A11 | SMO | 10 | 10 | Random |
| A12 | SMO | 15 | 5 | Random |
| A13 | SMO | 5 | 15 | Normal |
| A14 | SMO | 10 | 10 | Normal |
| A15 | SMO | 15 | 5 | Normal |

A sample of polysorbate 20 (Tween 20) labelled as C1, and polysorbate 80 (Tween 80) labelled as C2, were also included as comparisons of a prior art adjuvants.

The synthesised adjuvants were then analysed for various desired properties, and the results are shown below.

Contact Angle & Cloud Point

The properties of contact angle and cloud point were determined for the synthesised adjuvants by the methods described herein. Results are shown in Table 2 below.

TABLE 2

Contact angle and cloud point of synthesised adjuvants

| Adjuvant | Contact Angle (°) 0.20 wt. % | Cloud Point (°) 1 wt. % |
|---|---|---|
| A1 | — | 66 |
| A2 | — | 32 |
| A3 | — | <20 |
| A4 | 61.1 | 60.8 |
| A5 | 60.2 | 40.5 |
| A6 | 55.7 | <20 |
| A7 | 66.0 | 60.4 |
| A8 | 65.0 | 48.4 |
| A9 | 56.0 | <20 |
| A10 | 69.6 | 48.6 |
| A11 | 65.6 | 34.4 |
| A12 | 60.6 | <20 |
| A13 | — | 51 |
| A14 | — | 36 |
| A15 | — | <20 |
| C1 | 74.3 | — |
| C2 | 79.5 | — |

The adjuvants of the present invention resulted in a lower contact angle than the comparative adjuvants C1 or C2. Reduced contact angle indicates enhanced spreading of water droplets on leaf surfaces. Contact angles are also not so low as to overly increase droplet runoff, helping to maximise droplet retention on treated plants.

The cloud point results for the adjuvants of the present invention were within the desired range.

Foaming

The property of foaming was determined for the synthesised adjuvants by the method described herein. Results are shown in Table 3 below.

TABLE 3

Foaming performance of synthesised adjuvants

| Adjuvant | Foam Height (mm) 1 wt. % | | |
|---|---|---|---|
| | Initial | 30 minutes | 1 hour |
| A4 | 28 | 12 | 5 |
| A5 | 21 | 5 | 4 |
| A6 | 11 | 3 | 0 |
| A7 | 24 | 8 | 5 |
| A8 | 19 | 6 | 4 |
| A9 | 4 | 1 | 0 |
| A10 | 26 | 6 | 5 |
| A11 | 16 | 5 | 3 |
| A12 | 2 | 0 | 0 |
| C1 | 37 | 12.5 | 8.5 |
| C2 | 34 | 26 | 24 |

The foam height, and therefore the presence of foam, for the adjuvants of the present invention was lower at the initial measurement, after 30 minutes, and at 1 hour in comparison to the comparative adjuvants C1 and C2. The adjuvant of the present invention provides a clear benefit of lower foaming compared to prior adjuvants.

Cold Water Dissolution Time

The properties of cold water dissolution were determined for the synthesised adjuvants by the methods described herein. Results are shown in Table 4.

TABLE 4

Cold water dissolution of synthesised adjuvants

| Adjuvant | Dissolution Time (s) 1 wt. % |
|---|---|
| A1 | 45.2 |
| A2 | 31.4 |
| A3 | 11.9 |
| A4 | 21 |
| A5 | 38 |
| A6 | 46 |
| A7 | 48 |
| A8 | 22 |
| A9 | 15 |
| A11 | 22 |
| A12 | 30 |
| A13 | 56.5 |
| A14 | 14.7 |
| A15 | 8.7 |
| C2 | >180 |

The cold water dissolution time for the adjuvants of the present invention was lower than the comparison C2 adjuvant. The adjuvants of the present invention therefore show good cold water dissolution performance.

Surface Tension of Adjuvants

The adjuvants were tested for equilibrium surface tension, dynamic surface tension, and interfacial tension, and results are shown in Table 5 below.

TABLE 5

Surface tension of synthesised adjuvants

| Adjuvant | EST (mN/m) 0.10 wt. % | EST (mN/m) 0.20 wt. % | DST (mN/m) at 5 ms | DST (mN/m) at 80 ms | DST (mN/m) at 1250 ms | IFT (mN/m) 0.20 wt. % |
|---|---|---|---|---|---|---|
| A1 | 33.4 | — | — | — | — | — |
| A2 | 32.0 | — | — | — | — | — |
| A3 | 32.8 | — | — | — | — | — |
| A4 | 32.1 | 32.0 | 63.48 | 61.51 | 44.11 | 3.5 |
| A5 | 31.9 | 31.9 | 63.45 | 61.46 | 43.94 | 3.1 |
| A6 | 32.3 | 32.6 | 62.66 | 60.17 | 40.34 | 5.1 |
| A7 | 33.9 | 33.2 | 64.03 | 62.33 | 46.49 | 3.0 |
| A8 | 33.5 | 33.1 | 63.99 | 62.29 | 46.21 | 3.0 |
| A9 | 33.0 | 32.7 | 62.89 | 60.55 | 41.05 | 4.6 |
| A10 | 33.2 | 33.1 | 65.11 | 63.87 | 51.34 | 3.8 |
| A11 | 33.3 | 33.3 | 64.30 | 62.73 | 47.78 | 3.8 |
| A12 | 33.8 | 33.7 | 63.02 | 60.76 | 41.84 | 6.1 |
| A13 | 33.5 | — | — | — | — | — |
| A14 | 33.7 | — | — | — | — | — |
| A15 | 34.2 | — | — | — | — | — |
| C1 | 36.4 | 35.7 | 65.19 | 64.01 | 51.81 | — |
| C2 | 42.0 | 38.3 | 66.69 | 65.87 | 56.85 | — |

The adjuvants of the present invention were found to have reduced surface tension values over commercially available adjuvants C1 and C2. IFT values of the synthesised adjuvants were also observed to be in the desired range.

In particular it can be seen that adjuvants of the present invention when compared to analogous prior art adjuvants provide for reduced DST. A4-A9 adjuvants are based on SML, and when compared to C1 (also based on SML) provide for reduced DST values. Likewise, adjuvants A10-A12 which are based on SMO provide for reduced DST values when compared to prior art adjuvant C2 which is also based on SMO.

Viscosity of Adjuvants

The adjuvants were tested for performance in minimise gelling. Measurements of viscosity were obtained at 5° C., 25° C., and 40° C., and the results are shown in Table 6 below.

TABLE 6

Viscosity of synthesised adjuvants

| Adjuvant | Viscosity (mPa · s) at shear rate of 100 s$^{-1}$ 5° C. | 25° C. | 40° C. |
|---|---|---|---|
| A1 | 1527 | 373.8 | 165.7 |
| A2 | 1406 | 334.8 | 145.8 |
| A3 | 1528 | 350.2 | 149.2 |
| A4 | 1057 | 254.8 | 112.2 |
| A5 | 1329 | 319.7 | 141 |
| A6 | 1442 | 334.8 | 144.5 |
| A7 | 1364 | 340.7 | 152.9 |
| A8 | 1347 | 337.3 | 151.7 |
| A9 | 1411 | 338.9 | 147.1 |
| A10 | 1222 | 320.9 | 148.2 |
| A11 | 978.9 | 262.5 | 122.4 |
| A12 | 1028 | 268.3 | 123.3 |
| A13 | 1299 | 348.8 | 161.4 |
| A14 | 1168 | 306.5 | 140.7 |
| A15 | 1210 | 308.3 | 139.5 |
| C1 | 1800 | 411.5 | 177.4 |
| C2 | 2173 | 494.5 | 213.1 |

The adjuvants all demonstrated low viscosity without inclusion of either alcohols or glycols. The results indicated that the adjuvants of the present invention all provided good rheological performance.

Agrochemical Formulation Examples

The adjuvants of the present invention were tested in agrochemical formulations for adjuvancy performance. Different weed species were selected for each active ingredient to assess control using various adjuvant treatments. The weeds species selected for use were velvetleaf, morningglory, ragweed and pigweed, cugrass, foxtail, and barnyardgrass.

Formulations were made up including adjuvants of the present invention (shown Tables 7 to 10). The adjuvants of the present invention were formulated at both 10 wt. % and 20 wt. % with 2,4-D 2-Ethylhexyl (Isooctyl) ester, and all were found to be fully soluble and stable.

TABLE 7

2,4-D Diglycolamine 500 g/L SL

| Component | Weight % | S.G. | Active Ingredient g/L | Adjuvant g/L |
|---|---|---|---|---|
| 2,4-Dichlorophenoxyacetic, diglycolamine salt | 61.3 | 1.21 | 510 | |
| Adjuvants A1 through A15 | 15.0 | | | 182 |
| Water | 23.7 | | | |
| Total | 100.0 | | | |

S.G.—Specific Gravity at 25° C.
Ratio of active to adjuvant—2.8

TABLE 8

2,4-D Ester 680 g/L EC

| Component | Weight % | S.G. | Active Ingredient g/L | Adjuvant g/L |
|---|---|---|---|---|
| 2,4-Dichlorophenoxyacetic, 2-ethylhexyl ester | 90.0 | 1.14 | 681 | |
| Adjuvants A1 through A15 | 10.0 | | | 114 |
| Total | 100.0 | | | |

S.G.—Specific Gravity at 25° C.
Ratio of active to adjuvant—6.0

TABLE 9

2,4-D Ester 600 g/L EC

| Component | Weight % | S.G. | Active Ingredient g/L | Adjuvant g/L |
|---|---|---|---|---|
| 2,4-Dichlorophenoxyacetic, 2-ethylhexyl ester | 80.0 | 1.14 | 605 | |
| Adjuvants A1 through A15 | 20.0 | | | 228 |
| Total | 100.0 | | | |

S.G.—Specific Gravity at 25° C.
Ratio of active to adjuvant—2.7

TABLE 10

2,4-D Ester 400 g/L EW

| Component | Weight % | S.G. | Active Ingredient g/L | Adjuvant g/L |
|---|---|---|---|---|
| 2,4-Dichlorophenoxyacetic, 2-ethylhexyl ester | 54.0 | 1.12 | 401 | |
| Adjuvants A1 through A15 | 6.0 | | | 67 |
| Water | 40.0 | | | |
| Total | 100.0 | | | |

S.G.—Specific Gravity at 25° C.
Ratio of active to adjuvant—6.0

The effectiveness of the adjuvant combination of the present invention was assessed. The formulation of the present invention, and for the comparative formulation, were assessed for solubility and stability. The results for the formulation of the present invention were good and did not exhibit separation under any of the storage conditions.

Use of the adjuvants of the present invention in formulations with 2,4-D amine and ester resulted in good to excellent weed control.

It is to be understood that the invention is not to be limited to the details of the above embodiments, which are described by way of example only. Many variations are possible.

The invention claimed is:

1. An agrochemical formulation comprising:
   i) an adjuvant; and
   ii) at least one agrochemical active;
   wherein said adjuvant has general structure (I):

$$\text{Sorb}(AO_1H)_{n1}(AO_2H)_{n2}(AO_3H)_{n3}(AO_4R^1)_{n4} \quad (I)$$ 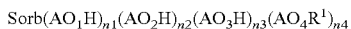

wherein:
   Sorb represents a residue of a sorbitan or sorbitan derivative;
   $AO_1$, $AO_2$, $AO_3$, and $AO_4$ each independently represents an oxyalkylene group formed from oxyethylene and oxypropylene units, wherein each of $AO_1$, $AO_2$, $AO_3$, and $AO_4$ is a block copolymer of oxyethylene and oxypropylene, wherein a molar proportion of oxyethylene units in the block copolymer is in the range between 20% and 90%;
   the total sum of oxyethylene units and oxypropylene units per molecule of general structure (I) is in the range from 5 to 38;
   n1, n2, n3, and n4 each represent an integer having a value of 1;
   $R^1$ represents an alkanoyl group —C(O)$R^2$ wherein $R^2$ represents a $C_4$ to $C_{28}$ hydrocarbyl; and
   the number of oxyethylene units in each oxyalkylene group present is independently an integer in the range from 1 to 8.

2. The agrochemical formulation according to claim 1, wherein the residue of a sorbitan or sorbitan derivative is selected from 1,4-anhydrosorbitol, 1,5-anhydrosorbitol, and 3,6-anhydrosorbitol.

3. The agrochemical formulation according to claim 1, wherein said alkanoyl group is a residue of a fatty acid.

4. The agrochemical formulation according to claim 3, where the fatty acid is selected from linear or branched, saturated or unsaturated, $C_8$ to $C_{28}$ fatty acids.

5. The agrochemical formulation according to claim 4, wherein the fatty acid is selected from an unsaturated fatty acid.

6. The agrochemical formulation according to claim 5, wherein the iodine value of the unsaturated fatty acid is greater than 70.

7. The agrochemical formulation according to claim 1, wherein each of $AO_1$, $AO_2$, $AO_3$, and $AO_4$ is a reverse block copolymer of oxyethylene and oxypropylene.

8. The agrochemical formulation according to claim 1, wherein the molecular weight (weight average) of the adjuvant is in the range from 450 to 2,700.

9. The agrochemical formulation according to claim 1, wherein the molar proportion of oxyethylene units in the block copolymer is in the range between 30% and 80%.

10. The agrochemical formulation according to claim 1, wherein the molar proportion of oxyethylene units in the block copolymer is in the range between 40% and 80%.

11. A concentrate formulation suitable for making an agrochemical formulation, said concentrate comprising:
    i) an adjuvant, wherein said adjuvant wherein said adjuvant has general structure (I):

$$\text{Sorb}(AO_1H)_{n1}(AO_2H)_{n2}(AO_3H)_{n3}(AO_4R^1)_{n4} \quad (I)$$ 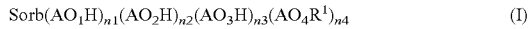

wherein:
    Sorb represents a residue of a sorbitan or sorbitan derivative;
    $AO_1$, $AO_2$, $AO_3$, and $AO_4$ each independently represents an oxyalkylene group formed from oxyethylene and oxypropylene units, wherein each of $AO_1$, $AO_2$, $AO_3$, and $AO_4$ is a block copolymer of oxyethylene and oxypropylene;
    the total sum of oxyethylene units and oxypropylene units per molecule of general structure (I) is in the range from 5 to 38;
    n1, n2, n3, and n4 each independently represent an integer having a value of 1;
    $R^1$ represents an alkanoyl group —C(O)$R^2$ wherein $R^2$ represents a $C_4$ to $C_{28}$ hydrocarbyl; and
    the number of oxyethylene units in each oxyalkylene group present is independently an integer in the range from 1 to 8; and
    ii) optionally, at least one agrochemical active.

12. A compound having general structure (I):

$$\text{Sorb}(AO_1H)_{n1}(AO_2H)_{n2}(AO_3H)_{n3}(AO_4R^1)_{n4} \quad (I)$$ 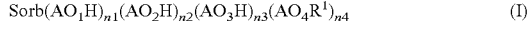

wherein:
    Sorb represents a residue of a sorbitan or sorbitan derivative;
    $AO_1$, $AO_2$, $AO_3$, and $AO_4$ each independently represents an oxyalkylene group formed from oxyethylene and oxypropylene units, wherein each of $AO_1$, $AO_2$, $AO_3$, and $AO_4$ is a block copolymer of oxyethylene and oxypropylene;

the total sum of oxyethylene units and oxypropylene units per molecule of general structure (I) is in the range from 5 to 38;

n1, n2, n3, and n4 each independently represent an integer having a value of 1;

$R^1$ represents an alkanoyl group —C(O)$R^2$ wherein $R^2$ represents a $C_4$ to $C_{28}$ hydrocarbyl;

suitable for use as an adjuvant in an agrochemical formulation; and the number of oxyethylene units in each oxyalkylene group present is independently an integer in the range from 1 to 8.

13. A method of treating vegetation to control pests, the method comprising applying a formulation according to claim 1 either to said vegetation or to an immediate environment of said vegetation.

* * * * *